United States Patent Office 3,218,487
Patented Nov. 16, 1965

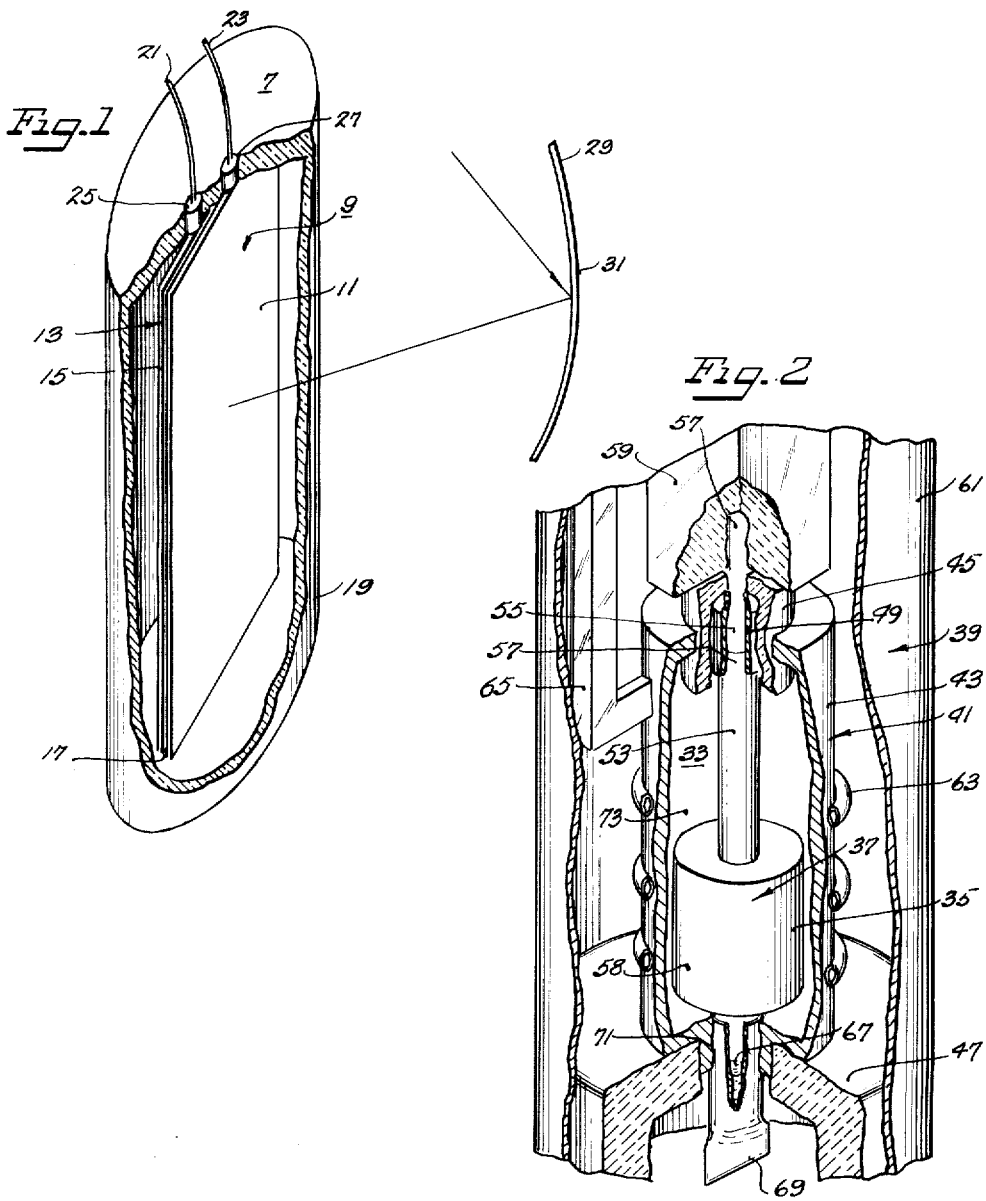

3,218,487
HIGH TEMPERATURE THERMIONIC
GENERATOR
Robert W. Pidd and Ling Yang, San Diego, Calif., and David V. Ragone, Ann Arbor, Mich., assignors to General Dynamics Corporation, New York, N.Y., a corporation of Delaware
Filed Nov. 15, 1960, Ser. No. 69,447
15 Claims. (Cl. 310—4)

The present invention generally relates to high temperature-low pressure systems and more particularly relates to improvements in high temperature-low pressure plasma conversion systems.

High temperature-low pressure plasma conversion systems include thermionic converters, that is, heat-to-electric energy converters, also referred to as plasma cells, plasma thermocouples, etc.

Thermionic converters are presently of particular interest with respect to direct heat-to-electricity conversion in such applications as solar generators, atomic reactors for electric power plants and the like. Through the use of such thermionic converters it is possible to directly convert solar energy into electricity. It is also possible to convert the high heat of an atomic reactor generated by nuclear fission directly into electricity without necessitating the use of conventional steam generation equipment, i.e., steam boilers, steam turbines, etc. Thus, it is possible to construct electric power plants operating with atomic reactors in a more compact, simpler manner and at a relatively low cost.

Thermionic converters usually are in the form of sealed cells, which include a vapor of an easily ionizable material, such as cesium. Such cells also include a hot electrode or cathode or electron emitter, operating at temperatures from about 1000° C. to about 2000° C. and a cold electrode, anode or collector spaced from the cathode and operating at from about 0° C. to about 1000° C., i.e., at a lower temperature than the cathode. Temperatures outside these ranges are also possible. A sealed vapor-tight envelope is provided so that the space between the cathode and anode can be maintained under relatively low pressure. In a typical thermionic converter at operating temperature, cesium or other easily ionizable material is present in such space as a vapor under a pressure of only from about $10^{-6}$ mm. Hg to about 1 mm. Hg. In operation, the hot electrode or cathode is heated to a temperature which causes electrons to boil off of its hot surfaces into the indicated space, and pass to the cold electrode. Leads are connected to each electrode, which leads serve to connect the electrodes to an external load. Thus, part of the heat of the hot electrode is converted into electric current.

The cesium vapor has the effect of increasing the rate at which the electrons boil off of the hot electrode surface and also reduces energy lost at the cold electrode. Moreover, it also forms an ionized gas or plasma which neutralizes the electron space charge in the region between the hot electrode and cold electrode, thereby allowing the electrons to pass more readily through such region from the hot electrode to the cold electrode.

One important difficulty which is usually encountered with such a system is its limited lifetime of operation, principally due to deterioration of the hot electrode through the process of evaporation. The vapor pressure of the cesium is sufficiently low so that the hot electrode evaporation proceeds substantially as free evaporation into a perfect vacuum. Such evaporation results in loss of material from the hot electrode which reduces the dimensions thereof. In a typical arrangement for use in an atomic reactor, the hot electrode includes a reactor fuel. Loss of dimensions of the hot electrode of each of a plurality of such cells in the reactor is particularly serious, ultimately interfering with the operation of the reactor.

Whether or not nuclear fuel is used in the cathode, difficulties arise with the usual thermionic converter. The material evaporated from the hot electrode tends to deposit out on the surface of the cold electrode and, depending upon its nature, has a more or less debilitating effect, i.e., that of reducing the optical reflection coefficient of the cold electrode. In other words, heat radiated by the hot electrode becomes absorbed by the cold electrode to a greater extent due to a decreased optical reflection coefficient and such heat is permanently lost. The higher the optical reflection coefficient of the cold electrode surface, the greater the proportion of the radiation impinging upon the cold electrode surface reflected back to the hot electrode for conversion into electricity. A further deleterious effect during operation of the usual thermionic converter, which effect occurs as a result of deposition of material from the cathode on the cold electrode surface, is the resultant increase in the work function of the cold electrode surface.

The operating temperature of the hot electrode can be reduced in order to extend the useful lifetime of the thermionic converter by reducing the rate of evaporation of material from the cathode. However, with such reduction in operating temperature there is a concomitant reduction in the efficiency of operation of the converter and the output power. Conversely, efficiency and power in this type of electric generator markedly increase with an increases in hot electrode temperature, but at the expense of useful lifetime for the converter.

It would therefore be of considerable benefit to provide a thermionic converter which is resistant to the described permanent evaporation of emitter from the hot electrode. Such a converter could operate at higher temperatures and therefore provide greater efficiency and power performance with extended lifetime of operation. Furthermore, materials which cannot at present be utilized in the hot electrode because of their high vapor pressures, but which materials would otherwise be particularly suitable for use in hot electrodes, could be employed in a thermionic converter which is not subject to the aforesaid permanent evaporation of the emitter from the hot electrode. It would also be of benefit to provide a thermionic converter which maintains the high optical reflection coefficient and the low work function of the cold electrode surface.

Accordingly, it is the primary object of the present invention to provide improved means for high temperature-low pressure conversion systems. It is a further object of the present invention to provide an improved thermionic converter which has improved life of operation, which avoids permanent loss of hot electrode material and, accordingly, is capable of efficient operation over extended periods of time at very high temperatures. It is a still further object of the present invention to provide an improved solar generator. It is also an object of the present invention to provide an improved thermionic converter for use in an atomic reactor. It is a further object of the present invention to provide improved means for preventing permanent loss of material from the hot electrode of a thermionic converter and for limiting reductions in optical reflection coefficient and increases in the low work function of the cold electrode surface thereof. It is still a further object of the present invention to provide an improved thermionic converter incorporating a fuel body in the hot electrode thereof, which fuel body has improved dimensional stability in use.

Further objects and advantages of the present invention are set forth in the following detailed description and in the accompanying drawings of which:

FIGURE 1 is a schematic perspective view of a portion of a solar generator type of thermionic converter, in accordance with the present invention, portions being broken away to illustrate the internal construction thereof; and FIGURE 2 is a schematic perspective view of a portion of a thermionic converter in accordance with the present invention, in place in a fuel element for an atomic reactor, portions being broken away to illustrate the internal construction thereof.

The present invention generally comprises a new type of high temperature-low pressure conversion system utilizing an improved medium which includes a carrier gas and which may include a readily ionizable material and may form a plasma during operation of the system. More particularly, the improved medium when utilized in a thermionic converter results in the prevention of permanent loss of material from the hot electrode of the converter and, accordingly, improvements in the life of the converter, the efficiency of operation of the converter, etc. Such converters can be operated at higher temperatures for more efficient power generation utilizing improved materials not previously available because of high electrode material loss.

The high temperature-low pressure carrier gas-containing conversion system includes a first element designed to operate at a high temperature and spaced from a second element designed to operate at a lower temperature, and a zone therebetween which is evacuated to a low pressure and which contains essentially only the improved medium of the present invention. The evacuated zone may be achieved by placing both the first element and second element within an airtight envelope. Alternatively, either the first or second element may form part of the envelope with the remaining element within the envelope. It should be understood that such arrangements are contemplated, as well as those arrangements specifically set forth in FIGURES 1 and 2 of the accompanying drawings.

Now referring more particularly to FIGURE 1 of the accompanying drawings, one version of solar generator type thermionic converter is schematically illustrated. The illustrated solar generator employs a solar heat source external of the generator. The solar generator 7 can be constructed in accordance with the present invention and comprises a hot electrode or cathode 9, preferably of extended surface area, i.e., in the form of a large sheet or plate 11, as illustrated in FIGURE 1, and a cold electrode or anode 13 operated at lower temperature, and preferably of similar size and shape, i.e., comprising a sheet or plate 15. The anode and cathode are separated by a space 17, for example, up to about 0.25 inch in width (from cathode to anode) or any other suitable distance, through which, during operation of the solar generator, electrons pass. The space is also occupied by the improved medium which forms ionized vapor or plasma during operation of the generator, in accordance with the present invention, which vapor is at a low vapor pressure. Thus, cesium metal and carrier gas may, for example, be disposed within the envelope as the medium. When the system is heated to operating temperature, essentially the only pressure in the space during operation of the generator is that exerted by the plasma formed from vaporized and ionized cesium, and carrier gas. The cathode and anode are sealed within a vapor-tight envelope 19 within which is provided the afore-described relatively low pressure. It will be understood that the cathode or anode may comprise at least part of the envelope, if desired. Leads 21 and 23, respectively, are provided from the cathode and anode and extend out through the envelope through seals or insulators 25 and 27, respectively, for interconnection to an external electrical load to complete the circuitry. Means 29 are also provided, for example, in the form of a solar reflector 31 which concentrate and focus solar energy and direct it to the cathode for heating the cathode or hot electrode to a high temperature in order to bring about the aforedescribed emission of electrons, during which heating the described readily ionizable material of said medium is ionized to form a plasma. The cathode itself need only comprise an electron emitter, the emitter being heated by the heat source.

Now referring more particularly to the components of the solar generator schematically depicted in FIGURE 1, at the operating temperature of the solar generator the medium forms the plasma at low vapor pressure of, for example, between about $10^{-6}$ mm. Hg to about 2 mm. Hg in the space between the cathode and anode and which comprises an easily ionizable material, such as one or more alkali metals, including cesium, potassium, rubidium, sodium or the like, in the ionized vapor state, to which is added a carrier gas, in this instance comprising one or more halogens. Also contemplated as carrier gas, in accordance with the present invention, is hydrogen, hereinafter more fully described. The easily ionizable material and also the halogen may each be present in any suitable concentration between about $10^{-6}$ mm. Hg and about 1 mm. Hg to exert together the above-described pressure. Usually, the easily ionizable material will be present in an amount sufficient to obtain particle densities in the vapor state within the envelope of from $10^{17}$ to $10^{12}$ particles per cc. Preferably, the halogen is present in a concentration of about 1 mm. of Hg.

Under the conditions of operation of the solar generator illustrated in FIGURE 1, the halogen combines to some extent with the easily ionized material to form an ionized halide. However, free halogen is usually also present, as well as free alkali metal. Thus, for example, if cesium is utilized as the readily ionizable material and iodine is utilized as the carrier gas, durng operation of the generator some of the odine in the plasma combines with the ionized cesium vapor to form ionized cesium iodide. If fluorine is used instead of the iodine, some of the fluorine is present in the plasma as ionized cesium fluoride. Similarly, the halides of chlorine and bromine may be formed with the cesium in the plasma. If, instead, potassium, rubidium, sodium or another easily ionizable metal vapor is used in the plasma, the metal halide is present to some extent in the plasma. Accordingly, a thermionic converter is provided which has at the operating temperature a plasma which includes a halide and also free halogen. This is in contrast to the conventional converter which contains at the operating temperature only alkali metal vapor such as ionized cesium vapor in the plasma.

The cathode of the solar generator illustrated in FIGURE 1 comprises an electron emitter, for example, tungsten or the like which is of extended surface area, for example, as shown in FIGURE 1 a relatively thin sheet. The anode may be of similar size and shape, i.e., extended surface area and comprise, for example, metal such as copper, nickel or other suitable electrically conductive material.

The envelope may be any suitable vapor-tight material capable of withstanding a relatively low pressure and spaced a suitable distance from both the anode and cathode in accordance with the construction of some solar generators. The envelope is, at least in the section adjacent the cathode, constructed of an infrared radiation-transparent material, such as glass, quartz or the like. Solar heat radiation is directed through the envelope and on to the adjacent surface of the cathode, as illustrated in FIGURE 1, by means of the reflector 31. Thus, solar heat radiation heats the cathode to a temperature sufficient to cause electron emission therefrom.

As the cathode 9 increases in temperature, due to the direction thereupon of solar energy from the solar heat source, to a point usually between about 1000° C. and 2000° C. where a large number of electrons boil off of the surfaces thereof, some of said electrons pass into the space 17 between the cathode and anode for transfer to the anode. However, evaporation of the cathode also increases, particularly since the cathode is present in essentially a vacuum within the envelope.

Suppression of permanent evaporation of the cathode is effected by the presence of the halogen in the plasma formed at such temperature from the readily ionizable material of the medium. In this connection, emitter material of the cathode, such as tungsten, vaporizes and passes into contact in the vaporized state with the plasma, and thereby comes into contact with and becomes plated out at the cold electrode 13 surface by reason of the lower temperature at such electrode surface, i.e., the cold electrode temperature is usually from about 0° C. to 1000° C. and substantially lower than that of the hot electrode, for example, 500° C. to 1000° C. lower.

However, the plasma which contains cesium or other ionized metal also contains sufficient amounts of halogen such as iodine or fluorine, which latter material reacts with the emitter material on the cold electrode surface to form a halide therewith. The molecular halide thus formed enters the plasma, in turn comes into contact with the heated surface of the hot electrode and is decomposed thereby into the emitter material and free halogen, at least a portion of the emitter material becoming redeposited upon the hot electrode surface, and the gaseous halogen being released for additional combination at the cold electrode surface with further amounts of emitter material being deposited out thereon.

Meanwhile, the halide formed in the plasma by combination with the ionized cesium vapor or other easily ionized metal becomes ionized and aids, as does free cesium present in the plasma, in the transfer of electrons from cathode to anode in a manner similar to that of cesium vapor alone in a conventional cesium plasma cell.

In the described process, halogen is not used up but performs the double function of forming part of the conductor for the electrons and also the carrier gas by means of which material from the cathode deposited out on the cold electrode is carried back and redeposited upon the cathode.

Accordingly, the dimensions of the cathode are substantially maintained, longevity of the cathode is increased over that of conventional apparatus, and the afore-described difficulties normally encountered in thermionic converters with respect to reduction in the optical reflection coefficient and increase in work function of the surface of the cold electrode due to permanent deposition of cathode material thereon are substantially avoided. The same effect is achieved whatever alkali metal vapor is employed in the plasma and whatever halogen is also employed therewith. It will be understood that during operation of the converter the hot electrode operates at a temperature at least sufficient to decompose molecular halide-containing cathode material which was deposited on the anode and which was later removed therefrom by the halogen. The anode temperature is one which is below the vaporization temperature of the material vaporized from the cathode.

Accordingly, the present invention provides an improved thermionic converter in the form of a solar generator, and an improved medium for such converter.

Now referring more particularly to FIGURE 2 of the accompanying drawings, a thermionic converter 33 is schematically illustrated which is essentially similar to the solar generator of FIGURE 1, but which, however, instead of employing an external source of heat incorporates an internal source of heat, i.e., a fuel body 35 which, by reason of nuclear fission in an atomic reactor provides the necessary heat for incandescence and electron emission at the hot electrode 37. The thermionic converter 33 illustrated in FIGURE 2 is disposed within and forms part of an elongated fuel element 39, a portion of which is illustrated and which is readily insertable within the core of an atomic reactor (not shown) to bring about the necessary heat generation for the described electron emission at the cathode of the converter.

Referring again to FIGURE 2, the thermionic converter 33 includes a gas-tight envelope 41 spaced inwardly from the cladding 61 of the fuel element 39 formed of a generally cylindrical hollow anode, cold electrode or collector 43, and an electrical insulating component 45 which is joined at the top of the anode. A bottom insulating component 47 abuts the cladding 61 of the fuel element and supports the thermionic converter therein. The anode may be formed of any suitable electrically conductive high temperature material such as nickel or copper. The electrical insulating components may comprise, for example, suitable high temperature ceramic or the like.

As illustrated in FIGURE 2, the top insulating component 45 encloses and electrically insulates an electrically conductive coupling 49 from the anode. The coupling may be formed of niobium or other suitable material and securely connects the upper end 51 of the stem portion 53 of the fuel body 35 to the lower end portion 55 of an electrically conductive support rod 57. The lower end of the stem integrally connects to an expanded portion 58 of the fuel body. The conductor rod holds the fuel body in spaced relation from the envelope walls. The rod in turn extends up into and is integrally connected to a cathode bus 59 spaced from the casing or cladding 61 of the fuel element. The support rod 57 may comprise any suitable material such as silver, etc. and the cathode bus may be formed of copper or the like. The cladding may be any suitable material such as copper, etc.

The anode 43 may be provided along its external surface with suitable cooling coils 63, as illustrated in FIGURE 2 fabricated of stainless steel or other suitable material. A portion of the anode is also connected on its external surface with an upwardly extending anode bus 65 spaced from the cladding 61 and from the cathode bus 59, and which may be fabricated of any suitable material such as copper. The thermionic converter 33 is also provided at the bottom end thereof with a pool 67 of readily ionizable material disposed in a well 69 which extends down through an opening 71 in the bottom insulator 47. The well 69 is provided with a closed bottom end and an open upper end connected to the envelope and communicating with the interior thereof. The well may be formed of nickel, copper, etc.

The fuel body 35 may comprise any suitable nuclear fuel material which is used as the heat source, for example, uranium oxide, uranium carbide, etc. The nuclear fuel material may, but need not provide the emitter for the cathode 37. Thus, in the case where uranium dioxide is utilized as the nuclear fuel material, a jacket or sheath (not shown) of an electron emitter such as tantalum, tungsten, etc., may be provided around the nuclear fuel material. Instead, if uranium carbide or uranium carbide-zirconium carbide mixtures are employed as the nuclear fuel material for the fuel body, the carbide acts as the electron emitter and no separate jacket or sheath of electron emitter is needed.

A space 73 is provided between the cathode and anode, within the envelope, as previously described, and in such space during operation of the converter, a suitable carrier gas-containing plasma is provided, in accordance with the present invention. The plasma is at the previously described low pressure in the evacuated envelope and represents substantially all of the pressure in the envelope. The plasma may be composed of the same constituents in the same concentration ranges specified with regard to the embodiment illustrated in FIGURE 1. Thus, the plasma may be formed of a suitable medium and be halide and halogen containing and also may include free cesium or other alkali metal vapor, and may further contain hydrogen, if desired.

During operation of the thermionic converter 33, the fuel element is disposed within a reactor core where, by reason of the fission process, the fuel body increases in temperature to a point where electron emission occurs from the emitter of the cathode in contact with or forming part of the nuclear fuel material. Part of the emitter vaporizes due to the high temperature at the cathode, i.e., approximately, for example, 1800° C., which temperature is at least that necessary to decompose halides formed as hereinafter described, and passes into the halogen-containing plasma and begins to deposit out on the cold electrode, for example, at about 500° C.

If the emitter is part of the nuclear fuel material, i.e., the carbon of the nuclear fuel carbide, then the nuclear fuel metal, i.e., uranium is exposed at the surface of the cathode and also undergoes evaporation. Such nuclear fuel also passes into the plasma and deposits out on the cold electrode.

However, the halogen present in the plasma acts in the previously described manner to unite with metallic cathode material (uranium or metal emitter) deposited on the cold electrode, forms chemical compounds therewith, which vaporize into the plasma, come in contact with the hot electrode as halides, break down to their constituents due to the high temperature of the cathode, and deposit out the metal on the cathode. The chemical breakdown of the halide at the cathode releases halogen for re-employment in chemically combining with further amounts of cathode material being deposited upon the surface of the cold electrode.

Thus, the carrier gas allows uranium or other nuclear fuel deposited on the cold electrode to be carried back to and deposited on the hot electrode. This is also the case with tantalum, tungsten and similar metal emitters. Where a uranium carbide-zirconium carbide nuclear fuel body is employed as the cathode, uranium, zirconium and carbon will deposit out on the cold electrode. The uranium and zirconium can be readily removed by the halogen.

Where uranium carbide or other nuclear fuel carbide or a mixture of uranium carbide or other nuclear fuel carbide and a refractory metal carbide is utilized as the fuel body for the cathode, that is, whenever carbon evaporation from the hot electrode and deposition on the cold electrode occurs, it is advantageous to employ hydrogen as at least part of the carrier gas in the plasma.

The hydrogen is utilized for the purpose of reacting with the carbon which during operation of the converter undergoes evaporation from the cathode and deposition at the cold electrode surface (approximately 500° C.). Thus, the hydrogen in the plasma reacts with the carbon deposited upon the cold electrode surface and forms methane therewith. The formed methane and/or other hydrocarbons passes back into the plasma, comes in contact with the hot electrode surface (approximately 1800° C.) and breaks down to carbon and hydrogen, the former redepositing upon the hot cathode and the latter passing back into the plasma for reuse. The carbon redeposited on the hot electrode is incorporated therein in crystalline form and aids in maintaining the high optical coefficient of reflection of the hot electrode surface. Reduction of radiation power loss from the hot electrode surface is achieved.

Accordingly, improved thermionic converters utilizing external and internal heat sources have been described. Moreover, an improved medium for thermionic converters has been disclosed in accordance with the present invention. The improved thermionic converters are simple, durable and efficient. They employ a carrier gas which strips material from the anode or cold element of the apparatus under conditions of low pressure and high temperature and carries such material to the cathode or hot element for deposition thereon by breakdown of the chemical compound formed of the carrier gas and material carried from the anode or cold element. Thus, thermionic converters can be provided which operate with the electrodes thereof being maintained in good condition over extended periods of time. Various other advantages of the present invention are as set forth in the foregoing.

Various of the features of the present invention are set forth in the appended claims.

What is claimed is:

1. An improved high temperature-low pressure thermionic converter which comprises, in combination, a cathode adapted to emit electrons in high temperature, a conductive anode disposed opposite said cathode in closely spaced relation thereto and adapted to operate at a temperature lower than the operating temperature of said cathode, means electrically insulating said cathode and anode from one another, means for electrically coupling said cathode and anode in series to an external load, and a medium adapted to provide plasma at a pressure of not more than 2 mm. of Hg in an evacuated zone between said cathode and anode during operation of said converter, said medium comprising a readily ionizable material and a carrier gas capable of reacting with cathode material deposited at said anode during operation of said converter for transfer of said deposited material to and redeposition of said deposited material at said cathode, whereby the efficiency and stability of said converter are improved.

2. An improved high temperature-low pressure thermionic converter which comprises, in combination, a cathode adapted to emit electrons at high temperature, a conductive anode disposed opposite said cathode in closely spaced relation thereto and adapted to operate at a temperature lower than the operating temperature of said cathode, means electrically insulating said cathode and anode from one another, means for electrically coupling said cathode and anode in series to an external load, means providing an evacuated zone extending between said cathode and said anode, and a medium adapted to provide plasma at a pressure of not more than 2 mm. of Hg within said zone during operation of said converter, said medium comprising readily ionizable material and a carrier gas comprising hydrogen capable of chemically reacting with cathode material deposited at said anode during operation of said thermionic converter for transfer of said cathode material to and redeposition of said cathode material at said cathode, whereby the efficiency and stability of said converter are improved.

3. An improved high temperature-low pressure thermionic converter which comprises, in combination, a cathode adapted to emit electrons at high temperature, a conductive anode disposed opposite said cathode in closely spaced relation thereto and adapted to operate at a temperature lower than the operating temperature of said cathode, means electrically insulating said cathode and anode from one another, means for electrically coupling said cathode and anode in series to an external load, means providing an evacuated zone extending between said cathode and said anode, and a medium adapted to provide plasma at a pressure of not more than 2 mm. of Hg within said zone during operation of said converter, said medium comprising readily ionizable material and a carrier gas comprising halogen capable of chemically reacting with cathode material deposited at said anode during operation of said thermionic converter for transfer of said cathode material to and redeposition of said cathode material at said cathode, whereby the efficiency and stability of said converter are improved.

4. An improved high temperature-low pressure thermionic converter which comprises, in combination, a cathode adapted to emit electrons at high temperature, a conductive anode disposed opposite said cathode in closely spaced relation thereto and adapted to operate at a temperature lower than the operating temperature of said cathode, means electrically insulating said cathode and anode from one another, means for electrically coupling said cathode and said anode in series to an external load, means providing an evacuated zone extending between said anode and said cathode, and a medium adapted to provide plasma at a pressure of not more than 2 mm. of Hg within said zone during operation of the converter, said medium comprising alkali metal and a carrier gas comprising halogen capable of chemically reacting with cathode material deposited at said anode during operation of said converter for transfer of said cathode material to and redeposition of said cathode material at said cathode, whereby the efficiency and stability of said converter are improved.

5. An improved high temperature-low pressure thermionic converter which comprises, in combination, a carbon-containing cathode disposed within and spaced from said envelope and adapted to emit electrons at high temperature, an anode spaced from said cathode and adapted to operate at a temperature lower than the operating temperature of said cathode, means electrically insulating said cathode and anode from one another, means for electrically interconnecting said cathode and anode, means providing an evacuated zone between said cathode and anode, a medium adapted to provide plasma at low pressure within said zone, said medium comprising alkali metal and a carrier gas comprising hydrogen capable of chemically reacting with carbon deposited at said anode from said cathode during operation of said thermionic converter, for transfer of said carbon to and redeposition of said carbon at said cathode, whereby the efficiency and stability of said converter are improved.

6. An improved high temperature-low pressure solar generator which comprises, in combination, a gas-tight envelope, at least a portion thereof being transparent to infrared radiation, a cathode disposed within and spaced from said envelope, said cathode being disposed adjacent said infrared radiation transparent portion of said envelope, said cathode being adapted to operate at a high temperature, a conductive anode disposed opposite said cathode in closely spaced relation thereto and adapted to operate at a lower temperature than the operating temperature of said cathode, means electrically insulating said anode and said cathode from one another within said envelope, means for electrically coupling said cathode and said anode in series to a load external of said envelope, means external of said envelope for heating said cathode with infrared radiation to provide electron emission therefrom, and a medium adapted to provide plasma at a pressure of not more than 2 mm. of Hg within said envelope in the space between said cathode and anode during operation of said generator, said medium comprising a readily ionizable material and carrier gas, said carrier gas comprising a halogen capable of chemically reacting with said readily ionizable material and with cathode material deposited at said anode during operation of said solar generator for transfer of said cathode material to and redeposition of said cathode material at said cathode.

7. An improved high temperature-low pressure solar generator which comprises, in combination, a gas-tight envelope, at least a portion thereof being transparent to infrared radiation, a cathode disposed within and spaced from said envelope and adjacent said portion of said envelope, which is transparent to infrared radiation, said cathode being adapted to operate at a high temperature, a conductive anode disposed opposite said cathode in closely spaced relation thereto and adapted to operate at a lower temperature than the operating temperature of said cathode, means electrically insulating said anode and said cathode from one another within said envelope, means for electrically coupling said cathode and said anode in series to a load external of said envelope, means external of said envelope for heating said cathode with infrared radiation to provide electron emission therefrom, and a medium adapted to provide plasma disposed at a pressure of not more than about 2 mm. of Hg within said envelope in the space between said cathode and anode during operation of the generator, said medium comprising alkali metal and carrier gas, said carrier gas comprising a halogen capable of chemically reacting with cathode material deposited at said anode during operation of said solar generator for transfer of said cathode material to and redeposition of said cathode material at said cathode.

8. An improved high temperature-low pressure solar generator which comprises, in combination, a gas-tight envelope, at least a portion thereof being transparent to infrared radiation, a cathode disposed within and spaced from said envelope adjacent said infrared radiation transparent portion of said envelope, said cathode comprising tungsten and being adapted to operate at a high temperature, an anode comprising nickel disposed opposite said cathode in closely spaced relation thereto and adapted to operate at a lower temperature than the operating temperature of said cathode, means electrically insulating said anode and said cathode from one another within said envelope, means for electrically coupling said cathode and said anode in series to a load external of said envelope, solar reflector means external of said envelope for heating said cathode with infrared solar radiation to provide electron emission therefrom, and a medium adapted to provide plasma at low pressure within said envelope in the space between said cathode and anode, said medium comprising cesium and iodine, both said cesium and said iodine being at a vapor pressure during operation of said generator of not more than about 1 mm. Hg.

9. An improved high temperature-low pressure thermionic converter for use in an atomic reactor, which comprises, in combination, a gas-tight envelope, a cathode disposed within and spaced from said envelope and adapted to operate at high temperatures, said cathode including nuclear fuel and an electron emitter, an anode spaced from said cathode and adapted to operate at a lower temperature than said cathode, means electrically insulating said anode and cathode from one another within said envelope, means electrically interconnecting said cathode and anode external of said envelope, and a medium adapted to provide plasma at very low pressure within said envelope in the space between said cathode and anode, said medium comprising readily ionizable material and carrier gas capable of chemically reacting with cathode material deposited at said anode during operation of said converter for transfer of said cathode material to and redeposition of said cathode material at said cathode.

10. An improved high temperature-low pressure thermionic converter for use in an atomic reactor, which comprises, in combination, a gas-tight envelope, a cathode disposed within and spaced from said envelope and adapted to operate at high temperatures, said cathode including nuclear fuel and an electron emitter, an anode spaced from said cathode and adapted to operate at a lower temperature than said cathode, means electrically insulating said anode and cathode from one another within said envelope, means electrically interconnecting said cathode and anode external of said envelope, and a medium adapted to provide plasma at very low pressure within said envelope in the space between said cathode and anode, said medium comprising alkali metal and carrier gas comprising halogen capable of chemically reacting with cathode material deposited at said anode during operation of said converter for transfer of said cathode material to and redeposition of said cathode material at said cathode.

11. An improved high temperature-low pressure thermionic converter for use in an atomic reactor, which comprises, in combination, a gas-tight envelope, a cathode disposed within and spaced from said envelope and adapted to operate at high temperatures, said cathode comprising nuclear fuel carbide, an anode spaced from said cathode and adapted to operate at a lower temperature than said cathode, means electrically insulating said anode and cathode from one another within said envelope, means electrically interconnecting said cathode and anode external of said envelope, and a medium adapted to provide plasma at very low pressure within said envelope in the space between said cathode and anode, said medium comprising alkali metal and carrier gas comprising hydrogen, said alkali metal and said carrier gas during operation of said converter being at a vapor pressure of about 1 mm. Hg, said hydrogen being capable of chemically reacting with carbon deposited at said anode from said cathode during operation of said converter for transfer of said carbon to and redeposition of said carbon at said cathode.

12. An improved high temperature-low pressure thermionic converter for use in an atomic reactor, which comprises, in combination, a gas-tight envelope, a cathode disposed within and spaced from said envelope and adapted to operate at high temperature, said cathode comprising nuclear fuel and an electron emitter, an anode spaced from said cathode and adapted to operate at a lower temperature than said cathode, means electrically insulating said anode and cathode from one another within said envelope, means electrically interconnecting said cathode and anode external of said envelope, and a medium adapted to provide plasma at very low pressure within said envelope in the space between said cathode and anode, said medium comprising cesium and carrier gas comprising iodine, said cesium and said iodine during operation of said converter being at a vapor pressure of about 1 mm. Hg, said iodine being capable of chemically reacting with cathode material deposited at said anode during operation of said converter for transfer of said cathode material to and redeposition of said cathode material at said cathode.

13. An improved high temperature-low pressure thermionic converter for use in an atomic reactor, which comprises, in combination, a gas-tight envelope, a cathode disposed within and spaced from said envelope and adapted to operate at high temperature, said cathode comprising nuclear fuel and an electron emitter, an anode spaced from said cathode and adapted to operate at a lower temperature than said cathode, means electrically insulating said anode and cathode from one another within said envelope, means electrically interconnecting said cathode and anode external of said envelope, and a medium adapted to provide plasma at very low pressure within said envelope in the space between said cathode and anode, said plasma comprising cesium and carrier gas comprising fluorine, said cesium and fluorine during operation of said converter being at a vapor pressure of not more than 1 mm. Hg, said fluorine being capable of chemically reacting with cathode material deposited at said anode during operation of said converter for transfer of said cathode material to and redeposition of said cathode material at said cathode.

14. An improved high temperature-low pressure thermionic converter which comprises, in combination, a gas-tight envelope, a cathode disposed within and spaced from said envelope and adapted to operate at high temperature, said cathode comprising uranium carbide, an anode comprising nickel spaced from said cathode, forming part of said envelope and adapted to operate at a temperature lower than the operating temperature of said cathode, means electrically insulating said cathode from said anode and means electrically interconnecting said cathode and anode external of said envelope, and a medium adapted to provide plasma disposed at a low pressure within said envelope in the space between said cathode and anode, said medium comprising alkali metal and carrier gas, said carrier gas comprising hydrogen and halogen, said alkali metal vapor and said carrier gas each having a vapor pressure during operation of said converter of not more than about 1 mm. Hg, said hydrogen being capable of reacting with carbon vaporized from said cathode during operation of said converter and deposited at said anode for transfer of said carbon back to and redeposition of said carbon at said cathode, said halogen being capable of chemically reacting with uranium from said cathode deposited at said anode for transfer thereof back to and redeposition thereof at said cathode.

15. In a high temperature-low pressure thermionic converter incorporating carbon in the cathode, an improved medium adapted to provide plasma, which medium includes a carrier gas comprising hydrogen effective to chemically combine with carbon deposited out on the anode of the system, and to convey said carbon through said plasma to the cathode for redeposition thereon.

References Cited by the Examiner
UNITED STATES PATENTS

| 2,236,289 | 3/1941 | Hull | 310—4 |
|---|---|---|---|
| 2,510,397 | 6/1950 | Hansel | 310—4 |
| 2,697,183 | 12/1954 | Neunhoeffer | 313—223 |
| 2,837,666 | 6/1958 | Linder | 310—3 |

FOREIGN PATENTS

| 797,872 | 7/1958 | Great Britain. |
|---|---|---|
| 1,242,179 | 8/1960 | France. |

MILTON O. HIRSHFIELD, *Primary Examiner.*